(12) United States Patent
Smith et al.

(10) Patent No.: US 9,899,811 B2
(45) Date of Patent: Feb. 20, 2018

(54) CABLE PULLERS

(71) Applicant: Current Tools, Inc., Greenville, SC (US)

(72) Inventors: Michael R. Smith, Easley, SC (US); Dustin S. Trotter, Easley, SC (US)

(73) Assignee: Current Tools, Inc., Greenville, SC (US)

(*) Notice: Subject to any disclaimer, the term of this patent is extended or adjusted under 35 U.S.C. 154(b) by 137 days.

(21) Appl. No.: 14/639,633

(22) Filed: Mar. 5, 2015

(65) Prior Publication Data

US 2016/0261097 A1    Sep. 8, 2016

(51) Int. Cl.
*H02G 1/08*    (2006.01)

(52) U.S. Cl.
CPC .................................. *H02G 1/08* (2013.01)

(58) Field of Classification Search
CPC ......................................................... H02G 1/08
USPC ................................................. 254/134.3 FT
See application file for complete search history.

(56) References Cited

U.S. PATENT DOCUMENTS

| | | | | |
|---|---|---|---|---|
| 2,985,379 A | * | 5/1961 | Strickland | A01M 7/0082 239/127 |
| 3,223,384 A | * | 12/1965 | Gebo | H02G 1/08 254/134.3 FT |
| 3,968,952 A | * | 7/1976 | Newell | B66D 1/7447 254/134.3 R |
| 4,456,225 A | * | 6/1984 | Lucas | H02G 9/10 254/134.3 FT |
| 4,469,306 A | * | 9/1984 | Wimer | H02G 9/10 254/134.3 FT |
| 4,695,038 A | * | 9/1987 | Giroux | H02G 1/08 254/134.3 FT |
| 5,082,127 A | * | 1/1992 | Huang | B66C 23/48 212/181 |
| 5,238,225 A | * | 8/1993 | Hunt | E02F 5/10 242/392 |
| 5,388,781 A | * | 2/1995 | Sauber | B65H 54/02 242/365.6 |
| 5,829,605 A | * | 11/1998 | Poitras | B66C 23/48 212/180 |
| 6,193,218 B1 | * | 2/2001 | Philyaw | H02G 1/08 254/134.3 FT |
| 6,405,988 B1 | * | 6/2002 | Taylor | B60N 2/01516 248/429 |
| 7,070,168 B2 | * | 7/2006 | Plummer | B66D 1/28 254/134.3 FT |
| 7,216,848 B2 | * | 5/2007 | Plummer | H02G 1/08 254/134.3 FT |
| 7,384,023 B2 | | 6/2008 | Plummer | |
| 7,832,709 B2 | * | 11/2010 | O'Connor | H02G 1/08 254/134.3 FT |
| 7,926,788 B2 | | 4/2011 | Plummer | |
| 8,016,267 B2 | * | 9/2011 | Jordan | H02G 1/08 254/134.3 FT |

(Continued)

*Primary Examiner* — Marc Carlson
(74) *Attorney, Agent, or Firm* — Dority & Manning, P.A.

(57) ABSTRACT

Cable pullers are provided. A cable puller includes a frame, the frame including a plurality of frame members, and a pulling assembly supported by the frame, the pulling assembly including a motor and a capstan. The cable puller further includes a boom assembly extending from the pulling assembly. The pulling assembly is rotatable relative to the frame about a vertical axis.

20 Claims, 8 Drawing Sheets

(56) References Cited

U.S. PATENT DOCUMENTS

| | | | |
|---|---|---|---|
| 8,246,009 B2* | 8/2012 | Plummer | H02G 1/08 |
| | | | 254/134.3 FT |
| 8,302,936 B2 | 11/2012 | Plummer | |
| 8,308,138 B1* | 11/2012 | Jordan | H02G 1/08 |
| | | | 254/134.3 FT |
| 8,434,741 B2* | 5/2013 | Radle | H02G 1/06 |
| | | | 254/134.3 FT |
| 9,172,224 B2* | 10/2015 | Jordan | H02G 1/06 |
| 9,281,667 B2* | 3/2016 | Curts | H02G 1/06 |
| 2005/0051759 A1* | 3/2005 | Plummer | B66D 1/28 |
| | | | 254/134.3 FT |
| 2007/0034845 A1* | 2/2007 | Plummer | H02G 1/08 |
| | | | 254/134.3 FT |
| 2007/0221896 A1* | 9/2007 | Jordan | H02G 1/08 |
| | | | 254/134.3 FT |
| 2007/0284559 A1* | 12/2007 | Plummer | H02G 1/08 |
| | | | 254/134.3 FT |
| 2008/0224108 A1* | 9/2008 | O'Connor | H02G 1/08 |
| | | | 254/134.5 |
| 2009/0078921 A1* | 3/2009 | Plummer | H02G 1/08 |
| | | | 254/134.3 FT |
| 2010/0327242 A1* | 12/2010 | Radle | H02G 1/06 |
| | | | 254/134.3 R |
| 2013/0240807 A1* | 9/2013 | Radle | H02G 1/06 |
| | | | 254/134.3 FT |
| 2014/0131645 A1* | 5/2014 | Jordan | H02G 1/06 |
| | | | 254/134.3 R |

* cited by examiner

CABLE PULLERS

FIELD OF THE INVENTION

The present disclosure relates generally to cable pullers for pulling cable through conduits. In particular, the present disclosure relates generally to cable pullers with improved rotational features.

BACKGROUND OF THE INVENTION

Cable pullers in general are well-known devices for pulling power cables, data cables, or other wiring (collectively referred to as "cable") through conduits such as building conduits. A cable puller typically includes a capstan and a motor which powers and rotates the capstan. The cable or a rope tied to the cable is wound around and tails off the capstan during operation. The capstan thus generally acts as a force multiplier during operation. Use of the cable puller to pull the cable through the conduit allows a user of the cable puller to exert only a small force on the cable and/or rope. This relatively small force is translated into a large force of several thousand pounds which is exerted on the cable and/or rope and which provides enough force on the cable and/or rope to pull the cable through the conduit.

Examples of known cable pullers are provided in, for example, U.S. Pat. No. 8,434,741 to Radle et al. entitled "Powered Cable Puller"; U.S. Pat. No. 8,246,009 to Plummer entitled "Cable Puller with Pivot Adjuster for Converting Between Upward and Downward Cable Pulling"; U.S. Pat. No. 8,016,267 to Jordan et al. entitled "Wire Puller and Conduit Adapter"; U.S. Pat. No. 7,070,168 to Plummer entitled "Cable Puller Adapter"; and U.S. Patent Application Publication No. 2014/0131645 to Jordan et al. entitled "Wire or Rope Puller", all of which are incorporated by reference herein in their entireties.

One constant concern with cable pullers is the flexibility of the cable pullers. For example, in many cases, cable pullers must fit within and move around in small spaces to access the conduits through which cable must be pulled. Some known cable pullers have partially address these concerns by having features which facilitate pivotal movement of various components, such as conduit-engagement devices on the ends of the cable pullers, about horizontal axes. These features allow the cable pullers to access conduits at different heights and perform both "down-pull" and "up-pull" procedures. However, further and additional cable puller flexibility is desired.

Accordingly, improved cable pullers are desired in the art. In particular, cable pullers with improved rotational features would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, the present disclosure is directed to a cable puller. The cable puller includes a frame, the frame including a plurality of frame members, and a pulling assembly supported by the frame, the pulling assembly including a motor and a capstan. The cable puller further includes a boom assembly extending from the pulling assembly. The pulling assembly is rotatable relative to the frame about a vertical axis.

In accordance with another embodiment of the present disclosure, a cable puller is provided. The cable puller includes a frame, the frame including a plurality of frame members, and a pulling assembly supported by the frame, the pulling assembly including a motor and a capstan. The cable puller further includes a boom assembly extending from the pulling assembly. The cable puller further includes a shaft assembly extending generally longitudinally along a vertical axis between the frame and the pulling assembly, the shaft assembly including a shaft coupled to the pulling assembly and rotatable about the vertical axis, wherein rotation of the shaft about the vertical axis rotates the pulling assembly about the vertical axis relative to the frame.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
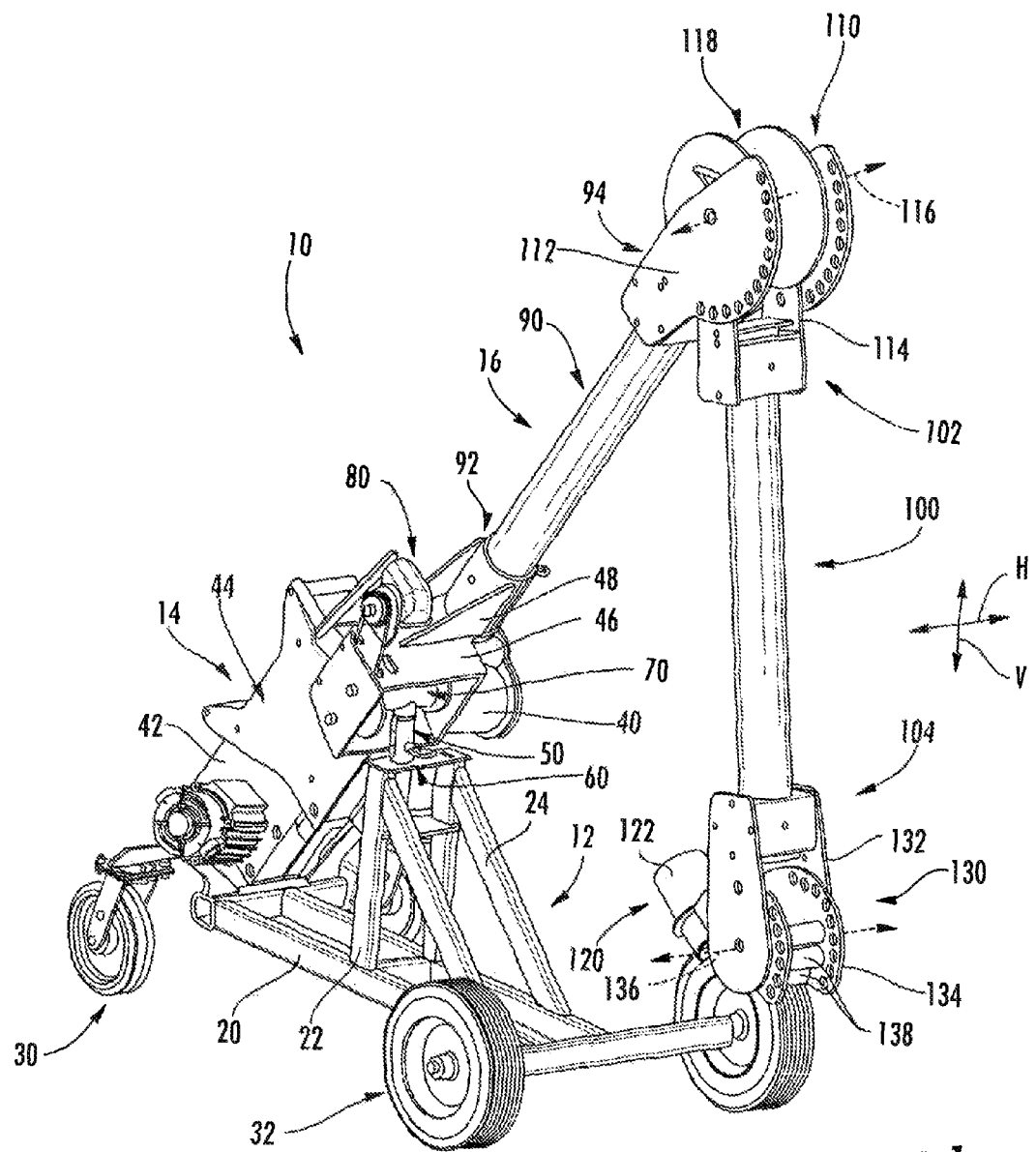
FIG. 1 is a side perspective view of a cable puller in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 8, various components of cable pullers 10 in accordance with the present disclosure are illustrated. Cable pullers 10 in accordance with the present disclosure generally include a frame 12 and a pulling assembly 14, and may further include a boom assembly 16 extending from the pulling assembly 14. Further, advantageously, the pulling assembly 14 may be rotatable relative to the frame 12 about various axes to facilitate flexibility of the cable pullers 10 during use. In particular, pulling assembly 14 may be rotatable about a vertical axis V (which may be defined as generally transverse to the surface on which the cable puller 10 is provided). Accordingly, when a cable puller 10 is utilized in small spaces where movement of the frame 12 is impeded, the pulling assembly 14 can be rotated relative to the frame 12 about such vertical axis V to generally align with a conduit through which cable is to be pulled independently of the alignment of the frame 12 with the conduit. Further, when the pulling assembly 14 is permitted to freely rotate relative to the frame 12, such freedom to rotate can advantageously allow the pulling assembly 14 to self-align with the conduit during pulling operations, independently of the alignment of the frame 12 with the conduit.

In exemplary embodiments, the rotational capabilities of the pulling assembly 14 relative to the frame 12 about the vertical axis V can be locked and thus prevented. Such locking may be advantageous during movement of the cable puller 10 between pulling operations. The rotational capabilities may further be unlocked and thus permitted as desired, such as for pulling operations.

In further exemplary embodiments, additional rotational movement of the pulling assembly 14 relative to the frame 12 may advantageously be provided in cable pullers 10 in accordance with the present disclosure. For example, pulling assembly 14 may be rotatable about a horizontal axis H (which may be defined as generally transverse to the vertical axis V). Still further, in some exemplary embodiments, boom assembly 16 may include various components which may be pivotable relative to each other to advantageously provide associated cable pullers 10 with further flexibility.

As illustrated, frame 12 includes a plurality of frame members which may be connected to form the frame 12. For example, as illustrated, a plurality of horizontal frame members 20 may form a base portion of the frame 12, and a plurality of vertical frame members 22 and angled frame members 24 may extend from the horizontal frame members 20 and base portion thereof. In some embodiments, the various frame members may be welded together to form the frame 12. Alternatively, however, any suitable connection of the various frame members, including via suitable adhesives, mechanical connections, etc., are within the scope and spirit of the present disclosure. In exemplary embodiments, the frame members may be formed from suitable metals, such as steel, aluminum, etc., although any suitable materials are within the scope and spirit of the present disclosure.

As further illustrated, in exemplary embodiments, a plurality of wheels may be connected to the frame 12. Such wheels may be rotatable, as is generally understood, to facilitate movement of the frame 12 and cable puller 10 generally relative to a surface on which the cable puller 10 is provided. In some embodiments, one or more wheels may be allowed to "swivel" or rotate about an axis transverse to the conventional rotational axis of the wheels. For example, as illustrated, one or more wheels may be swivel casters 30. Such swivel movement may facilitate flexibility in the movement of the cable puller 10 and ability of the cable puller 10 to make tight turns, etc. Other wheels, such as wheels 32, may be conventional fixed wheels (only rotatable about the conventional rotational axis of the wheels).

As discussed, cable puller 10 may further include a pulling assembly 14. Pulling assembly 14 may be generally supported by the frame 12, and may include various mechanical components for pulling cable. For example, pulling assembly 14 may include one or more capstans 40, and one or more motors 42. A motor 42 may drive a capstan 40, and thus cause rotation of the capstan 40, as required during for example cable pulling operations. Motor(s) 42 and capstan(s) 40 may be mounted on a body 44 of the pulling assembly 14. Body 44 may include various panels 46, brackets, 48, etc. to which various components of the pulling assembly 14 and other components of the cable puller 10 may be mounted.

Figure 2:
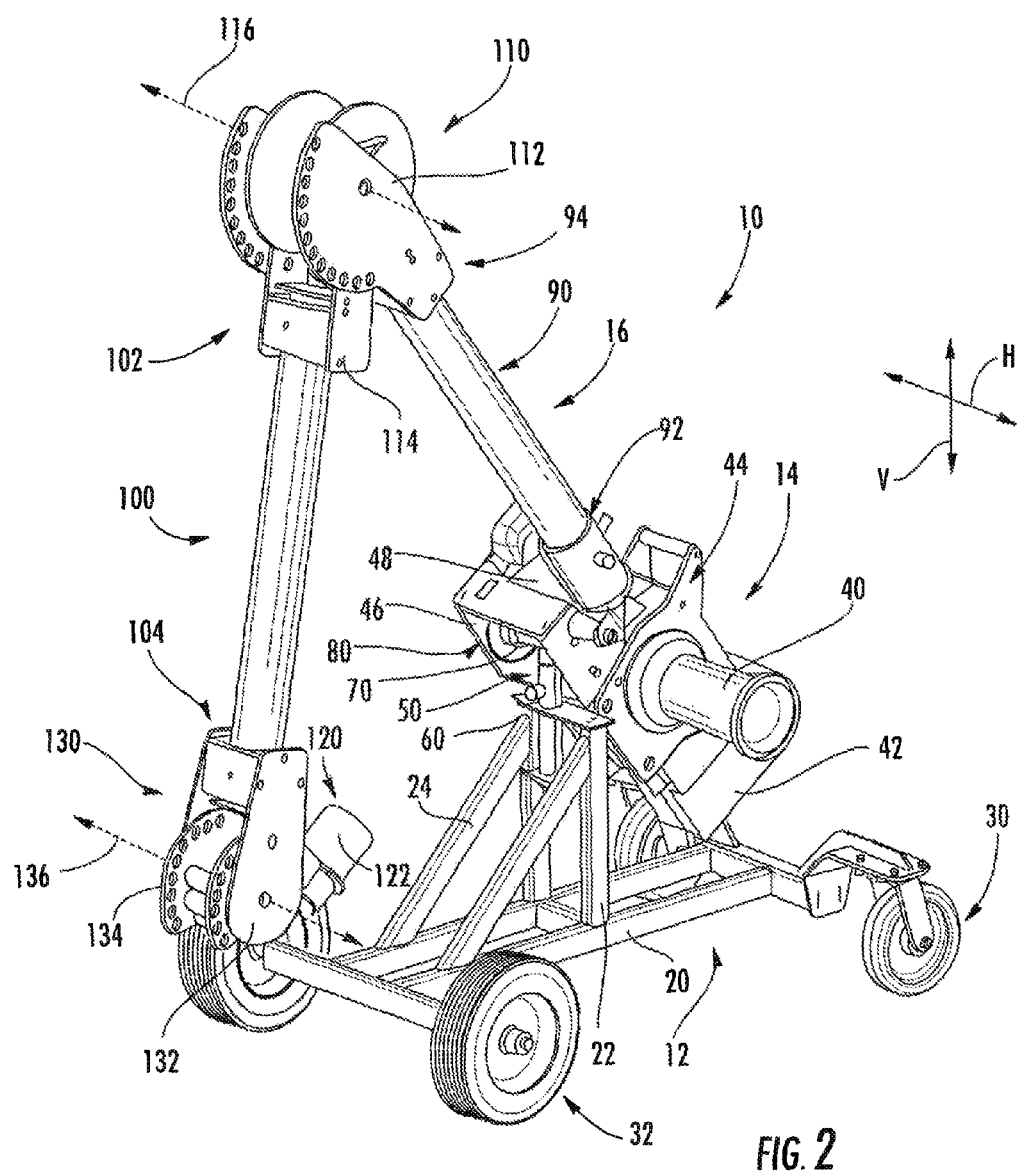
FIG. 2 is an opposite side perspective view of the cable puller of FIG. 1.
Figure 3:
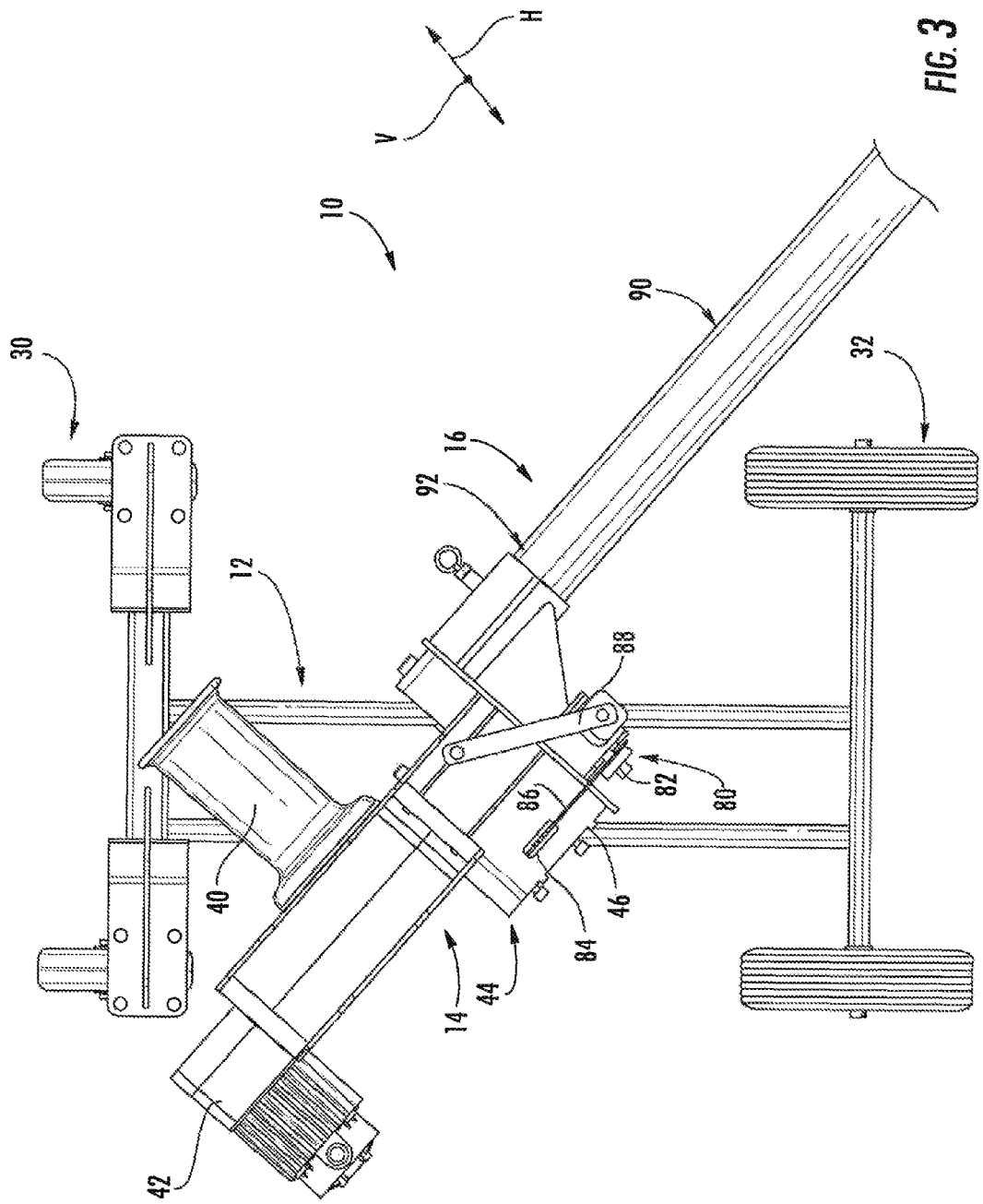
FIG. 3 is a top view of components of a cable puller, with a pulling assembly rotated about a vertical axis relative to a frame to a position different from the position of FIGS. 1 and 2, in accordance with one embodiment of the present disclosure.
Figure 4:
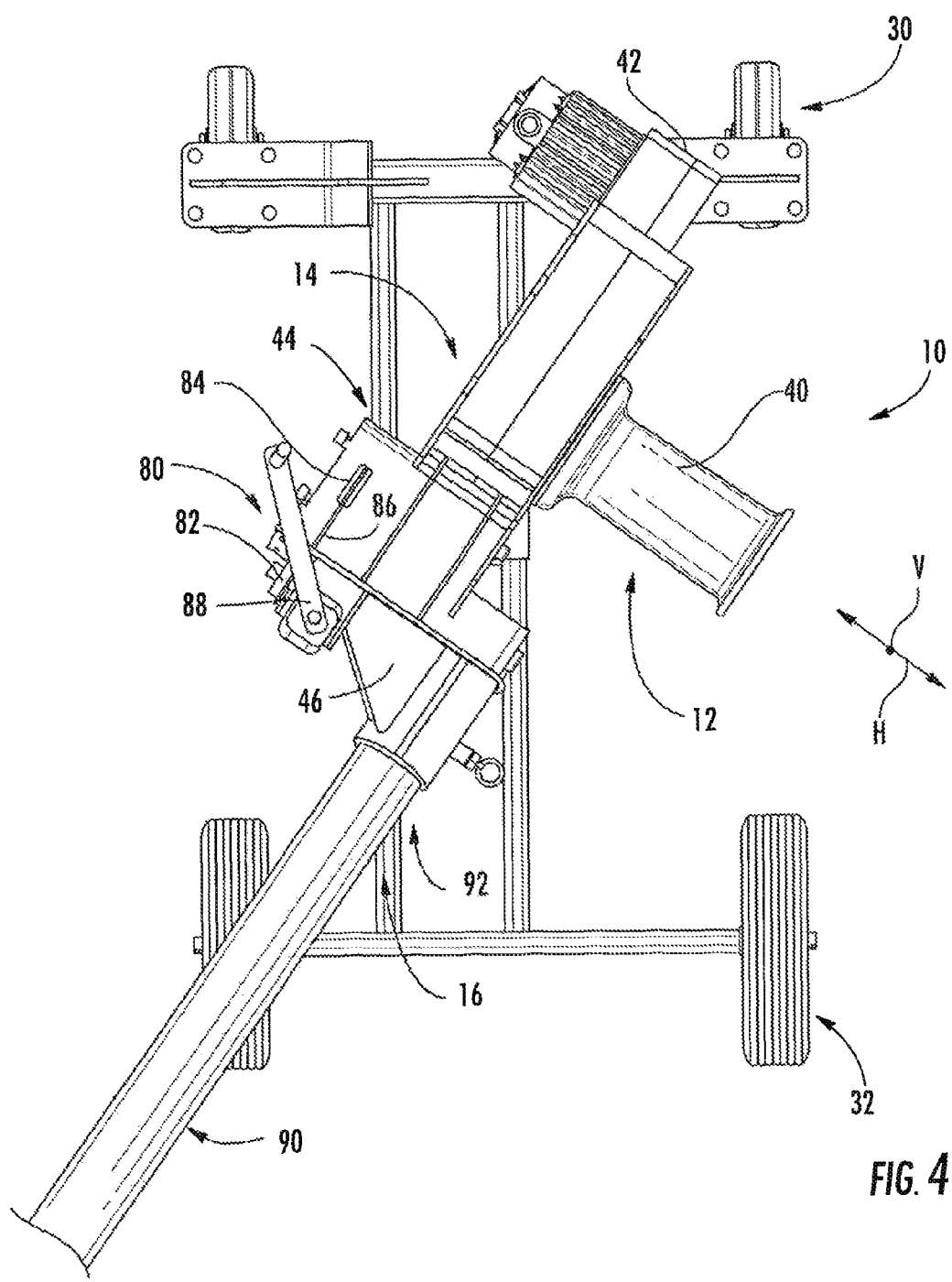
FIG. 4 is a top view of the components of the cable puller of FIG. 3, with the pulling assembly rotated about a vertical axis relative to a frame to a position different from the position of FIGS. 1, 2 and 3.

As further illustrated, pulling assembly 14 is rotatable relative to the frame 12 about vertical axis V. For example, FIGS. 1 and 2 illustrate the pulling assembly 14 in a first position relative to the frame 12. FIG. 3 illustrates the pulling assembly 14 rotated to a second position relative to the frame 12 about the vertical axis V, and FIG. 4 illustrates the pulling assembly 14 rotated to a third position relative to the frame 12 about the vertical axis V. Notably, in exemplary embodiments, the pulling assembly 14 may be freely rotational (when permitted to rotate, as discussed herein) relative to the frame 12 about the vertical axis V. In exemplary embodiments, 360 degrees of free rotation may be allowed, although in alternative embodiments the range of such free rotation may be limited.

FIGS. 1, 2, 5, 7 and 8 illustrate exemplary embodiments of components which facilitate such rotation of the pulling assembly 14 relative to the frame 12 about the vertical axis V. For example, as illustrated, cable puller 10 may further include a shaft assembly 50. Shaft assembly 50 may extend generally longitudinally along the vertical axis V between the frame 12 and the pulling assembly 14, and may generally couple the frame 12 and pulling assembly 14 together.

Shaft assembly 50 may include components which may rotate about the vertical axis V to facilitate rotation of the pulling assembly 14. For example, shaft assembly 50 may include a first shaft 52. First shaft 52 may extend longitudinally along the vertical axis V between a first end and a second end, and may be rotatable about the vertical axis V. Shaft 52 may further be coupled to the pulling assembly 14, such that rotation of the shaft 52 about the vertical axis V rotates the pulling assembly 14 about the vertical axis V relative to the frame 12.

In exemplary embodiments as illustrated, shaft assembly 50 may further include a second shaft 54. Second shaft 54 may extend longitudinally along the vertical axis V between a first end and a second end. Further, second shaft 54 may be connected to the frame 12. Such connection may be a fixed connection, such that the second shaft 54 is generally not movable relative to the frame 12. For example, second shaft 54 may be welded, mechanically fastened, or otherwise connected to the frame 12. First shaft 52 may be rotatable about the vertical axis V relative to the second shaft 54. For example, in some embodiments as illustrated, at least a portion of the first shaft 52 may be disposed within and rotatable within the second shaft 54. In other embodiments, at least a portion of the first shaft 52 may surround and be rotatable about the second shaft 54. The interaction between the first shaft 52 and second shaft 54 may thus generally couple the pulling assembly 14 and frame 12 together, and facilitate support of the pulling assembly 14 by the frame 12.

As illustrated in FIGS. 1, 2, 5, 7 and 8, shaft assembly 50 and/or cable puller 10 generally may further include a locking assembly 60. The locking assembly 60 may generally be utilized to alternately prevent and permit rotation of the pulling assembly 14 relative to the frame 12 about the vertical axis V. Accordingly, in exemplary embodiments when the locking assembly 60 is a component of the shaft assembly 50, the locking assembly 60 may generally be utilized to alternately prevent and permit rotation of the shaft 52 about the vertical axis V. For example, locking assembly 60 may be adjustable between a locked position wherein rotation of the shaft 52 about the vertical axis V is prevented and an unlocked position wherein rotation of the shaft about the vertical axis is permitted.

Figure 8:
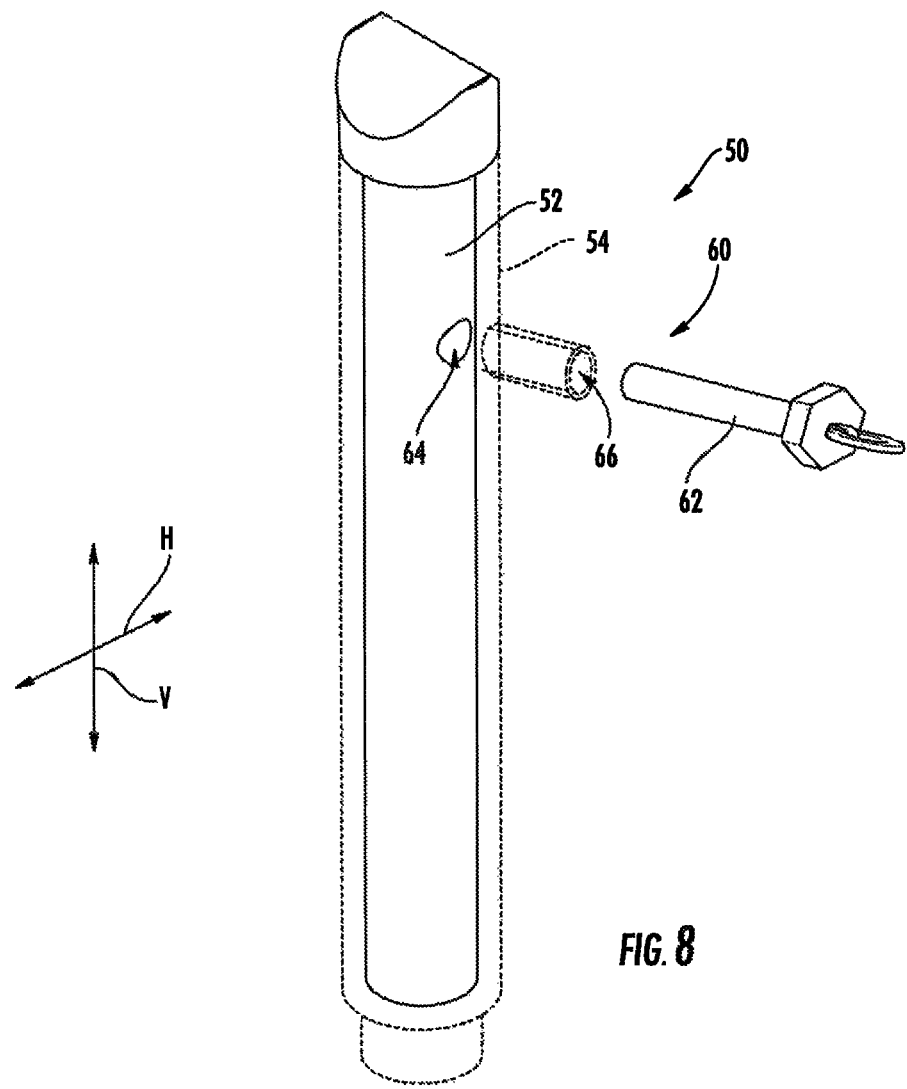
FIG. 8 is a perspective view of components of a shaft assembly for a cable puller in accordance with one embodiment of the present disclosure.

FIGS. 1, 2, 5 and 7 illustrate embodiments of locking assembly 60 in a locked position, while FIG. 8 illustrates an embodiment of locking assembly 60 in an unlocked position. In the embodiments illustrated, locking assembly 60 includes a pin 62 and a bore hole 64 defined in the first shaft 52. Locking assembly 60 may further include a passage 66 defined in the second shaft 54. In the locked position, pin 62 may extend through the bore hole 64, and further through the passage 66. When the pin 62 thus engages the bore hole 64, it effectively fixedly couples the shafts 52, 54, thus preventing rotation of the shaft 52 relative to the shaft 54. In the unlocked position, pin 62 is removed from the bore hole 64, and optionally from the passage 66, uncoupling the shafts 52, 54 and permitting rotation of the shaft 52 relative to the shaft 54.

Figure 5:
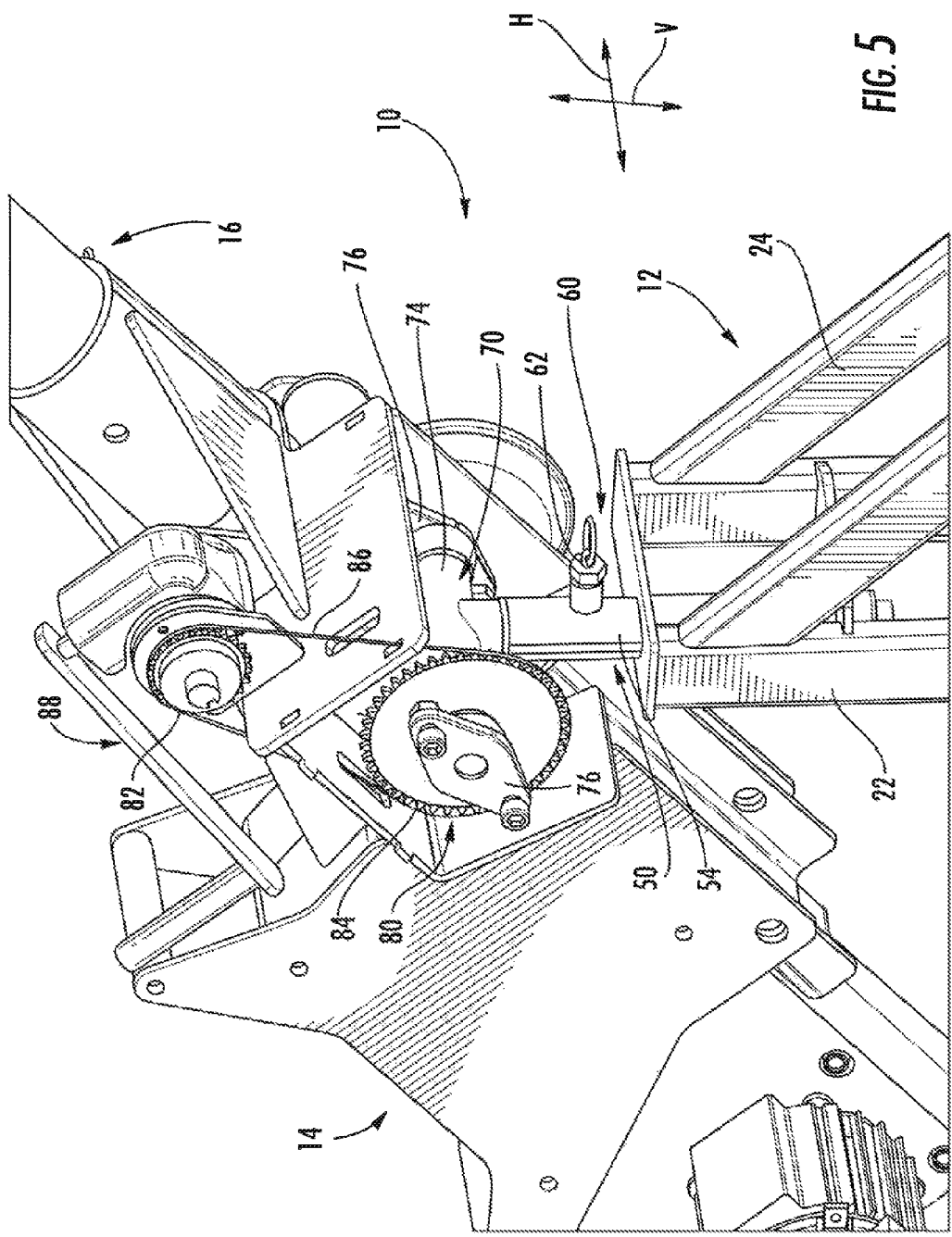
FIG. 5 is a perspective view of components of a cable puller, including a shaft assembly coupling a pulling assembly to a frame and a cut-away view of an actuator, in accordance with one embodiment of the present disclosure.
Figure 6:
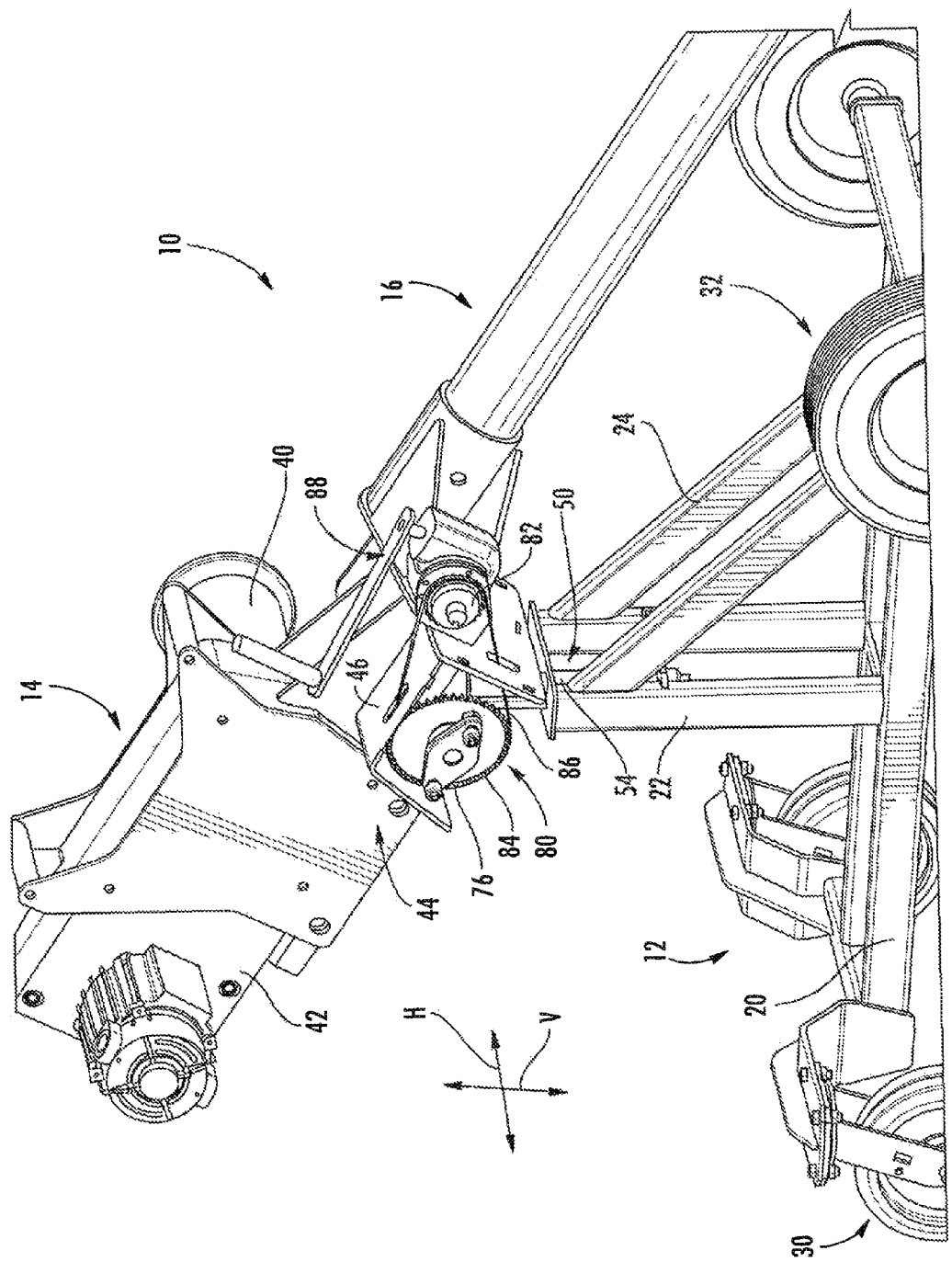
FIG. 6 is a perspective view of components of a cable puller, with a pulling assembly rotated about a horizontal axis relative to a frame to a position different from the position of FIGS. 1, 2 and 5, in accordance with one embodiment of the present disclosure.
Figure 7:
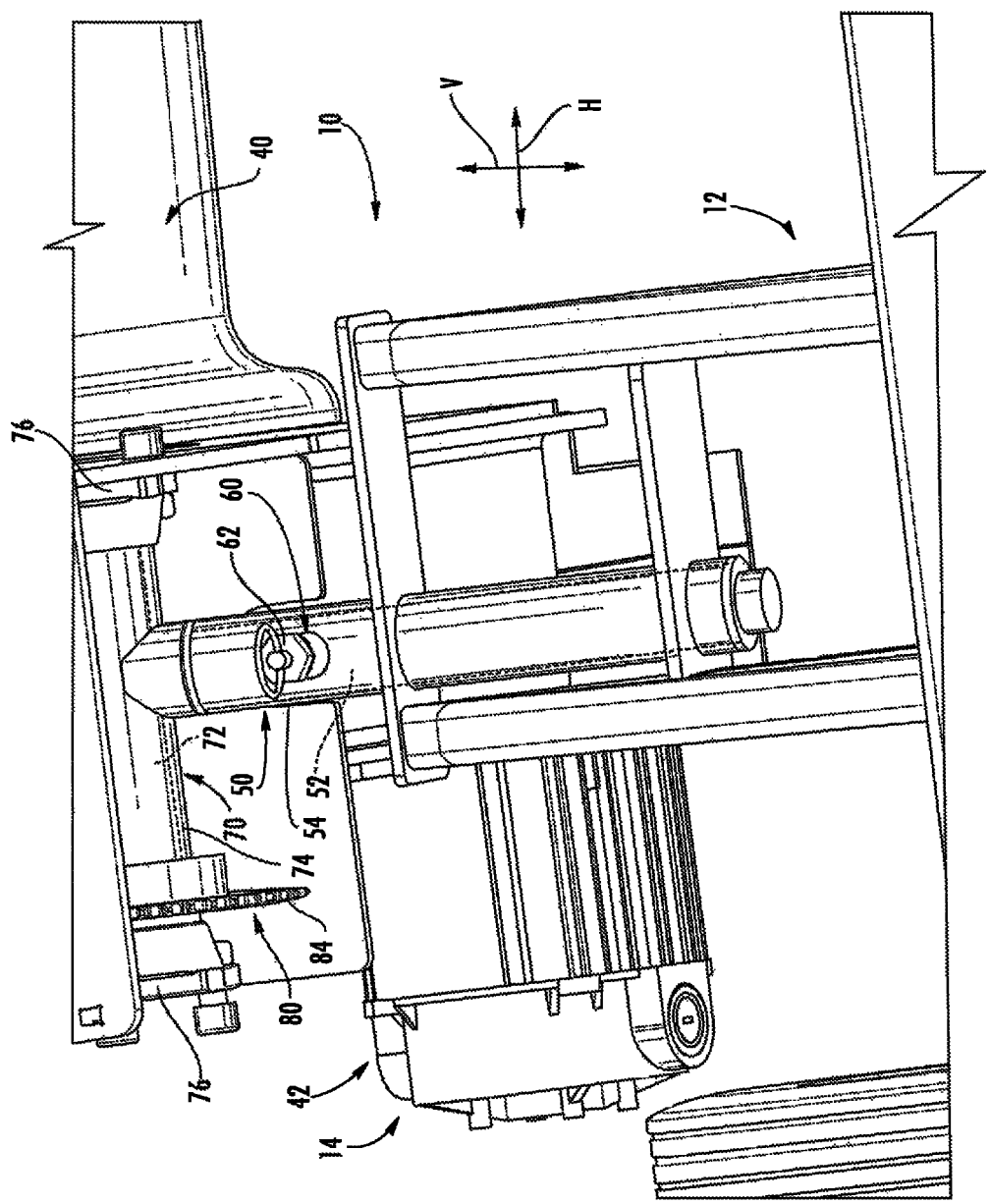
FIG. 7 is a front view of components of a cable puller, including a shaft assembly coupling a pulling assembly to a frame, in accordance with one embodiment of the present disclosure.

Cable puller 10 may further include features which facilitate rotation of the pulling assembly 14 relative to the frame 12 about other axes. For example, pulling assembly 14 may be rotatable relative to the frame 12 about a horizontal axis H which may be transverse to the vertical axis V. For example, FIGS. 1, 2 and 5 illustrate the pulling assembly 14 in a first position relative to the frame 12. FIG. 6 illustrates the pulling assembly 14 in a second position relative to the frame 12.

Cable puller 10 may include various components which facilitate the rotation of the pulling assembly 14 about the horizontal axis H. For example, cable puller 10 may further include a transverse shaft 70 assembly. Transverse shaft assembly 70 may extend generally longitudinally along the horizontal axis H, and may generally further couple the frame 12 and pulling assembly 14 together. For example, in exemplary embodiments as shown, the transverse shaft assembly 70 may couple the pulling assembly 14 and shaft assembly 50 together.

Transverse shaft assembly 70 may include components which may rotate about the horizontal axis H to facilitate rotation of the pulling assembly 14. For example, transverse shaft assembly 70 may include a first shaft 72. First shaft 72 may extend longitudinally along the horizontal axis H between a first end and a second end, and may be rotatable about the horizontal axis H. Shaft 72 may further be coupled to the pulling assembly 14, such that rotation of the shaft 72 about the horizontal axis H rotates the pulling assembly 14 about the horizontal axis H relative to the frame 12. For example, brackets 76 on the ends of the shaft 72 may be connected, such as fixedly connected, to the pulling assembly 14, such as to panels 46 thereof.

In exemplary embodiments as illustrated, transverse shaft assembly 70 may further include a second shaft 74. Second shaft 74 may extend longitudinally along the horizontal axis H between a first end and a second end. Further, in exemplary embodiments, second shaft 74 may be connected to the shaft assembly 50, such as to the first shaft 52 thereof, thus coupling the shaft assembly 50 to the pulling assembly 14. Such connection may be a fixed connection, such that the second shaft 74 is generally not movable relative to the first shaft 52. For example, second shaft 74 may be welded, mechanically fastened, or otherwise connected to the first shaft 52. First shaft 72 may be rotatable about the horizontal axis H relative to the second shaft 74. For example, in some embodiments as illustrated, at least a portion of the first shaft 72 may be disposed within and rotatable within the second shaft 74. In other embodiments, at least a portion of the first shaft 72 may surround and be rotatable about the second shaft 74. The interaction between the first shaft 72 and second shaft 74 may thus generally further couple the pulling assembly 14 and frame 12 together, and facilitate support of the pulling assembly 14 by the frame 12.

In exemplary embodiments, and referring now to FIGS. 1-7, an actuator 80 may be utilized to facilitate movement of the pulling assembly 14 about the horizontal axis H. In general, actuation of the actuator may cause rotation of the pulling assembly 14 about the horizontal axis H. For example, as illustrated, actuator 80 may be connected to the first shaft 72 of the transverse shaft assembly 70. Actuation of the actuator 80 may cause rotation of this shaft 72, and rotation of this shaft 72 may cause rotation of the pulling assembly 14.

In exemplary embodiments as illustrated, actuator 80 may be a gear assembly. The gear assembly may include, for example, a first gear 82 and a second gear 84. The gears may directly mesh, or as illustrated a chain 86 may connect the gears. First gear 82 may be a drive gear which is rotatable coupled to the pulling assembly 14. Second gear 84 may be connected, such as fixedly connected, to, for example, the transverse shaft assembly 70, such as the first shaft 72 thereof. Rotation of the first gear 82 may cause rotation of the second gear 84, which in turn may cause rotation of the first shaft 72 and rotation of the pulling assembly 14 generally.

A handle 88 may be connected to the first gear 82 to allow a user to rotate the first gear 82 and thus cause the resulting rotation. Handle 88 may be directly connected to the first gear 82, or may be connected via additional gears, etc.

It should be understood that actuator 80 need not be a gear assembly as illustrated. Rather, any suitable actuator, such as a pneumatic or hydraulic cylinder, an electric-based actuator, etc. is within the scope and spirit of the present disclosure.

Referring now in particular to FIGS. 1 and 2, a cable puller 10 in accordance with the present disclosure may further include a boom assembly 16. Boom assembly 16 may extend from and be connected (such as fixedly or rotatably connected) to the pulling assembly 14. Further, boom assembly 16 may include one or more arms, and may include a conduit engagement device. For example, as illustrated, boom assembly 16 may include a first arm 90 that extends between a first end 92 and a second end 94, and a second arm 100 that extends between a first end 102 and a second end 104. The first arm 90, such as the first end 92 thereof, may extend from and be connected to the pulling assembly 14. The second arm 100 may be pivotally coupled to the first arm 90.

For example, the second end 94 of the first arm 90 and the first end 102 of the second arm 100 may be pivotally coupled together. In exemplary embodiments, as illustrated, a joint assembly 110 may provide such pivotal coupling. Joint assembly 110 may include, for example, one or more first brackets 112 which are coupled to the first arm 90 (such as the second end 94 thereof) and one or more second brackets 114 which are coupled to the second arm 100 (such as the first end 102 thereof). The second brackets 114 and first brackets 112 may be pivotally connected at and thus pivotal with respect to each other about a pivot axis 116. Such pivoting of the brackets 112, 114 with respect to each other facilitates pivoting of the arms 90, 100 with respect to each other. In particular, as illustrated, the second arm 100 and bracket 114 may be pivotable with respect to first arm 90 and bracket 114. Notably, brackets 112, 114 may include bore holes (not labeled) therein. A pin (not shown) may be extended through such bore holes to lock the position of the brackets 112, 114 and arms 90, 100 relative to each other and thus prevent pivoting. Removal of the pin may permit pivoting.

Joint assembly 110 may further include, for example, a sheave 118 as illustrated or alternatively or one or more rollers. These components facilitate cable removal by providing a rotational path for the cable to follow between the conduit and the capstan 40.

Boom assembly 16 may further include a conduit-engagement device 120. In general, conduit-engagement device 120 is a device which is placed in contact with or partially within a conduit to provide guidance to cable being pulled from the conduit. A conduit-engagement device 120 may, for example, include a tube member 122 through which cable may traverse during cable pulling operations.

In exemplary embodiments, conduit-engagement device 120 may be pivotally coupled to the second arm 100, such as to the second end 104 thereof. In exemplary embodiments, as illustrated, a joint assembly 130 may provide such pivotal coupling. Joint assembly 130 may include, for example, one or more first brackets 132 which are coupled to the second arm 100 (such as the second end 104 thereof) and one or more second brackets 134 which are coupled to the conduit-engagement device 120. The second brackets 134 and first brackets 132 may be pivotally connected at and thus pivotal with respect to each other about a pivot axis 136. Such pivoting of the brackets 132, 134 with respect to each other facilitates pivoting of the arm 100 and conduit-engagement device 120 with respect to each other. In particular, as illustrated, the conduit-engagement device 120 and bracket 132 may be pivotable with respect to the second arm 100 and bracket 134. Notably, brackets 132, 134 may include bore holes (not labeled) therein. A pin (not shown) may be extended through such bore holes to lock the position of the brackets 132, 134 and arm 100 and conduit-engagement device 120 relative to each other and thus prevent pivoting. Removal of the pin may permit pivoting.

Joint assembly 130 may further include, for example, a plurality of rollers 138 as illustrated or alternatively a sheave. These components facilitate cable removal by providing a rotational path for the cable to follow between the conduit and the capstan 40.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cable puller, comprising:
   a frame, the frame comprising a plurality of frame members;
   a pulling assembly supported by the frame, the pulling assembly comprising a motor and a capstan;
   a shaft assembly extending generally longitudinally along a vertical axis between the frame and the pulling assembly, the shaft assembly comprising a shaft coupled to the pulling assembly and rotatable about the vertical axis, wherein rotation of the shaft about the vertical axis rotates the pulling assembly about the vertical axis relative to the frame; and
   a boom assembly extending from the pulling assembly.

2. The cable puller of claim 1, wherein the shaft is a first shaft and the shaft assembly further comprises a second shaft, and Wherein the first shaft is rotatable about the vertical axis relative to the second shaft.

3. The cable puller of claim 2, wherein a portion of the first shaft is disposed within the second shaft.

4. The cable puller of claim 1, wherein the shaft assembly further comprises a locking assembly, the locking assembly adjustable between a locked position wherein rotation of the shaft about the vertical axis is prevented and an unlocked position wherein rotation of the shaft about the vertical axis is permitted.

5. The cable puller of claim 4, wherein the locking assembly comprises a pin and a bore hole defined in the shaft, and wherein the pin extends through the bore hole in the locked position.

6. The cable puller of claim 1, wherein the pulling assembly is further rotatable about a horizontal axis, the horizontal axis transverse to the vertical axis.

7. The cable puller of claim 6, further comprising a transverse shaft assembly extending generally along the horizontal axis, the transverse shaft assembly comprising a shaft coupled to the pulling assembly and rotatable about the horizontal axis, the transverse shaft assembly coupled to the shaft assembly.

8. The cable puller of claim 7, further comprising an actuator connected to shaft of the transverse shaft assembly, wherein actuation of the actuator causes rotation of the shaft of the transverse shaft assembly, and wherein rotation of the shaft of the transverse shaft assembly causes rotation of the pulling assembly.

9. The cable puller of claim 8, wherein the actuator comprises a gear assembly.

10. The cable puller of claim 1, wherein the boom assembly comprises a first arm and a second arm each extending between a first end and a second end, the first end of the first arm connected to the pulling assembly, the second end of the first arm pivotally coupled to the first end of the second arm.

11. The cable puller of claim 10, further comprising a joint assembly pivotally coupling the first end of the second arm to the second end of the first arm.

12. The cable puller of claim 10, wherein the boom assembly further comprises a conduit-engagement device pivotally coupled to the second end of the second arm.

13. The cable puller of claim 12, further comprising a joint assembly pivotally coupling the conduit-engagement device to the second end of the second arm.

14. The cable puller of claim 1, further comprising a plurality of wheels connected to the frame.

15. The cable puller of claim 10, wherein at least one of the plurality of wheels is a swivel caster.

16. A cable puller, comprising:
   a frame, the frame comprising a plurality of frame members;
   a pulling assembly supported by the frame, the pulling assembly comprising a motor and a capstan; and
   a boom assembly extending from the pulling assembly,
   wherein the pulling assembly is rotatable relative to the frame about a vertical axis.

17. The cable puller of claim 16, further comprising a locking assembly, the locking assembly adjustable between a locked position wherein rotation of the pulling assembly about the vertical axis is prevented and an unlocked position wherein rotation of the pulling assembly about the vertical axis is permitted.

18. The cable puller of claim 16, wherein the pulling assembly is further rotatable relative to the frame about a horizontal axis, the horizontal axis transverse to the vertical axis.

19. The cable puller of claim 16, wherein the boom assembly comprises a first arm and a second arm, the first arm extending from the pulling assembly, the second arm pivotally coupled to the first arm.

20. The cable puller of claim 19, wherein the boom assembly further comprises a conduit-engagement device pivotally coupled to the second arm.

\* \* \* \* \*